United States Patent [19]

Kulkarni et al.

[11] Patent Number: 5,206,099
[45] Date of Patent: Apr. 27, 1993

[54] HIGHLY RESISTIVE CELL SEPARATOR FOR BI-POLAR BATTERY

[75] Inventors: Milind V. Kulkarni, Seabrook, Md.; William J. Eppley, Skippack, Pa.

[73] Assignee: Alliant Techsystems Inc., Edina, Minn.

[21] Appl. No.: 755,320

[22] Filed: Sep. 5, 1991

[51] Int. Cl.⁵ .............................. H01M 2/16
[52] U.S. Cl. ............................ 429/142; 429/248
[58] Field of Search ............ 429/248, 142, 247

[56] References Cited

U.S. PATENT DOCUMENTS

| | | | |
|---|---|---|---|
| 1,190,025 | 4/1916 | Skinner | 429/255 |
| 1,217,739 | 2/1917 | Flannery | 429/248 X |
| 4,275,130 | 6/1981 | Rippel et al. | 429/234 X |
| 4,284,691 | 8/1981 | Goebel et al. | 429/105 |
| 4,301,222 | 11/1981 | Emanuelson et al. | 429/251 |
| 4,554,616 | 10/1985 | Poa et al. | 429/248 X |
| 4,643,956 | 2/1987 | Sandelli et al. | 429/247 X |
| 4,687,717 | 8/1987 | Kaun et al. | 429/247 X |
| 4,737,421 | 4/1988 | Uemura et al. | 429/251 X |
| 4,789,561 | 12/1988 | Schäefer et al. | 429/248 X |
| 4,804,596 | 2/1989 | Ebner et al. | 429/218 X |
| 4,888,256 | 12/1989 | Zuckerbrod | 429/248 X |

Primary Examiner—John S. Maples
Attorney, Agent, or Firm—Haugen and Nikolai

[57] ABSTRACT

Material is incorporated in each of the cell separator membranes of an electrochemical cell having a layered construction wherein a plurality of commonly connected metal anode layers and a plurality of commonly connected cathode layers are arranged in a closely packed, stacked sandwich construction, separated by a plurality of thin insulating separator membranes which gives each cell separator a known resistance value which can be measured thereby allowing total cell resistance to be readily tested.

5 Claims, 1 Drawing Sheet

U.S. Patent
Apr. 27, 1993
5,206,099
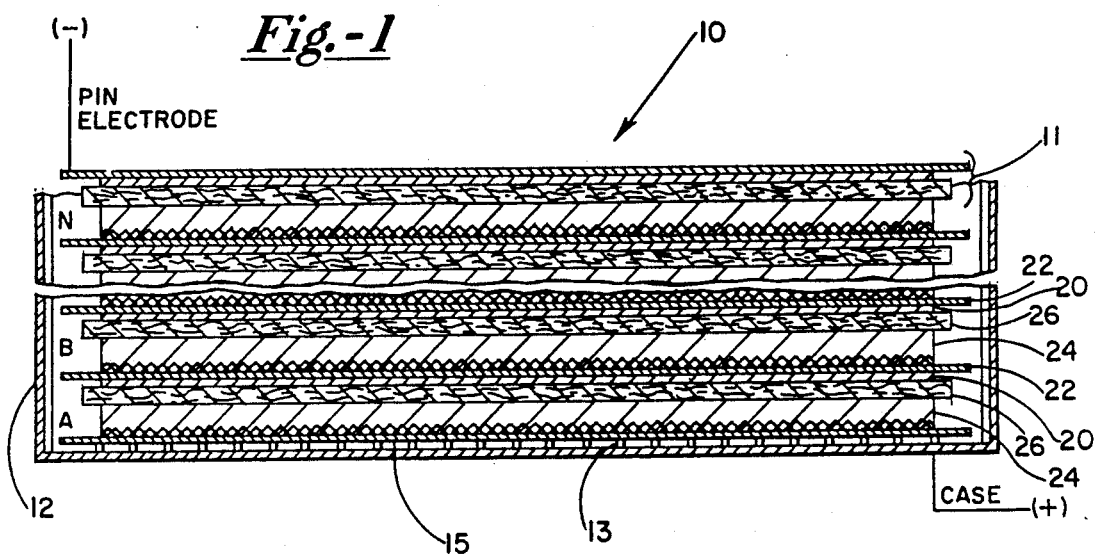
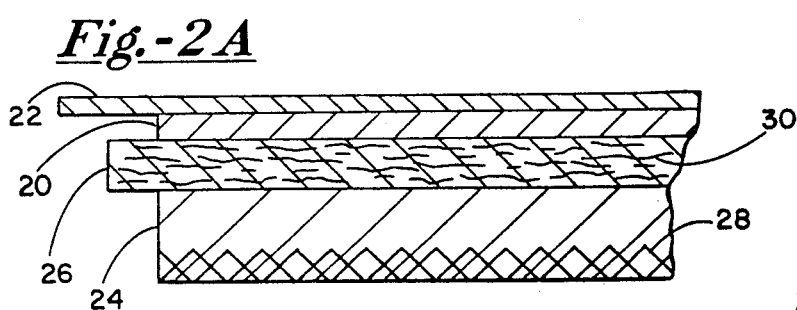
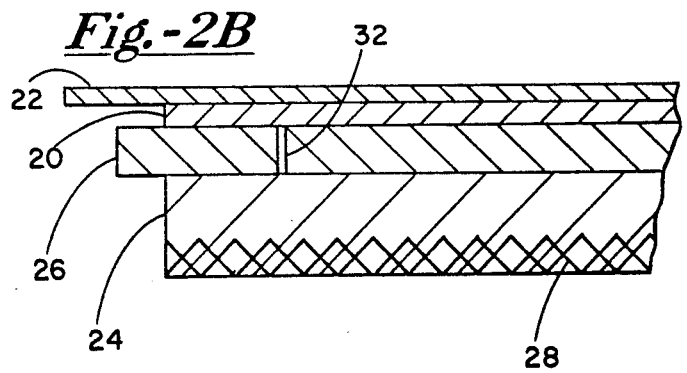

HIGHLY RESISTIVE CELL SEPARATOR FOR BI-POLAR BATTERY

BACKGROUND OF THE INVENTION

1. Field of the Invention

The present invention is directed generally to non-aqueous electrochemical cells or batteries having a plurality of sandwiched electrode layers and, more particularly, to an improved cell separator construction which allows reliable testing with respect to locating high or low resistance shorts which may develop in the cells during cell construction.

2. Description of the Related Art

Bipolar, multi-electrode layer cells of cylindrical construction are typical electrochemical cells of the class of interest in the present invention. They include a plurality of stacked battery components exposed to an electrolyte solution within the elongated housing of the cell which may be of metal or of a polymeric or plastic or prismatic material and is normally cylindrical in shape. The battery components are arranged in a concentric sandwich construction within the housing in which a plurality of metal anode structure layers and a plurality of carbon or other cathode electrode structures are arranged alternately with the electrode structures spaced by a plurality of separator membranes. The plurality of metal anode structures, each of which may be a lithium grid pressed into a nickel foil backing, generally employed within the cell may be arranged to be joined in parallel and in direct physical contact with the internal wall of the housing to form one pole of the bipolar cell. The plurality cathode structures, which may be carbon electrodes pressed into nickel grid cathode collector plates, are likewise joined to a second lead which is conducted outside the cell through an insulated connection to form a pin terminal on the top of the battery. A plurality of anode and cathode layers are normally pressed together in stacked fashion to form an extremely thin, high energy density composite cell. Because of the dense nature of the o cell construction and the relatively large area between the plurality of sets of oppositely charged cell plates, it is important that the integrity of the separators be consistent throughout to prevent internal shorts from robbing needed battery power.

In this regard, it has heretofore been somewhat difficult to ascertain the integrity of typical bipolar battery construction in the form of locating high or low resistance shorts which might occur between layers of the stacked electrodes. The present method involves the monitoring of known or presumed capacitance values between cells to determine if imperfections exist. The primary problem with this method, however, is that cell capacitance tends to vary over a wide range due to the variation in distance between anode and cathode in the stacked cells due to variation in the effective cell compression. This, of course, makes the method conductive fibers which may be unreliable. Another method is to attach a small lead wire to each collector plate to measure internal cell resistance. This approach is not always possible due to space limitations within the stacked construction together with increased intercell leakage due to a plurality of exposed lead wires. Thus, there remains a definite need to provide a simple yet reliable method of monitoring the quality control in multi-layer, stacked, bipolar battery construction.

SUMMARY OF THE INVENTION

By means of the present invention, problems associated with monitoring the quality control in the construction of bipolar multi-layer batteries with respect to determining the presence of high or low resistance shorts is solved by the provision of a simple yet reliable method and apparatus for checking cell resistance. This is accomplished by making the cell separators slightly conductive but having very high resistance values, on the order of megohms. Whereas, variations in the high resistance can readily be measured to monitor the integrity of cell construction, the very high resistance values utilized add but a very small amount of load current per cell, i.e., in the order of microamps, thereby detracting very little from cell performance.

The invention may be accomplished using any of several embodiments to produce cell separators of known high resistance. In one embodiment, conductive fibers, which may be carbon fibers, are admixed in a ceramic-type thin membrane separator medium capable of compression into sandwiched construction. In another embodiment, a normally non-conducting separator is provided with a conductive spot of measured resistance. This method allows the cell to have a measured resistance as opposed to an infinite resistance as applied, for example, to a dry reserve cell. During construction of the cell, the total resistance can be measured simply between the top cell collector plate and the bottom cell lead. This value will be equal to the addition of resistances in the stack. If a short is present during construction, it can easily be determined by comparing measured resistance to the calculated resistance.

BRIEF DESCRIPTION OF THE DRAWINGS

In the drawings, wherein like numerals designate like parts throughout the same:

FIG. 1 is an elevational view in cross section of an electrochemical cell constructed in accordance with the present invention;

FIGS. 2A and 2B are enlarged fragmentary views of the electrochemical cell of FIG. 1 showing the construction of typical electrode pair layers depicting two different separator embodiments; and FIG. 3 depicts an equivalent circuit across the laminar structure of the cell construction of FIG. 1 with respect to measuring resistance in accordance with the invention.

DETAILED DESCRIPTION

The accompanying figures are deemed to be illustrative of typical embodiments of the invention and the cross-sectional elevational view of FIG. 1 shows a typical construction which can be used with active or reserve cells. The cell or battery is depicted generally by 10 and includes a plurality of individual stacked parallel connected subcells or cell portions as at 11 compressed within a housing having side walls 12 and a bottom member 13 spaced from the bottom cell by a separator 15. The individual layers making up the subcells are better illustrated in FIGS. 2A and 2B. Thus, each includes an anode member 20, which is normally a grid structure of active alkali metal such as lithium, and which is, in turn, pressed into a nickel collector member 22, which may be a thin foil, or the like. The anode/collector combination is separated from a carbon or other cathode member 24 by a separator membrane, typically of a ceramic or paper material, shown at 26. The cathode, in turn, is carried on a metal grid cathode collector which is typically a nickel grid mesh indicated by 28.

The thin membrane ceramic or paper separator 26, in FIG. 2A, is provided with an amount of fibrous conductive materials such as carbon fibers shown as at 30 which impart a slight conductance across the separator membrane which, in turn, is translated into a known separator resistance value. In the embodiment of FIG. 2B, the conductance or, conversely, the resistance value of the separator is determined from a spot or small defined area of known conductance such as that depicted at 32.

FIG. 3 denotes a typical equivalent circuit for measuring the resistance across the plurality of separator membranes through the multi-layer cell construction. Thus, the total measurable resistance through the total cell can be measured from A to N very accurately in a well-known manner and, in this way, even small shorts within the system can be measured and, if necessary, pinpointed by measuring the resistance across each of the cell segment configurations or separators.

The invention has been described herein in considerable detail in order to comply with the Patent Statutes and to provide those skilled in the art with the information needed to apply the novel principles and to construct and use such specialized components as are required. However, it to be understood that the invention can be carried out using specifically different materials, equipment and devices and that various modifications can be accomplished without departing from the scope of the invention itself.

What is claimed is:

1. In an electrochemical cell having a bi-polar layered construction wherein a plurality of commonly connected metal anode layers and a plurality of commonly connected cathode layers are alternately arranged in closely packed, sandwich fashion, each anode and cathode layer being separated by one of a plurality of thin insulating separator membranes to produce a cell stack, the improvement comprising incorporating conductive material in each of the cell separator membranes which gives each cell separator membrane a high but known resistance value such that the total resistance of the plurality of separators can be measured across the entire stack when the stack is assembled without the presence of an electrolyte thereby enabling the total cell resistance to be readily tested to verify the integrity of the layers of the stack of the assembled cell.

2. The apparatus of claim 1 wherein the conductive material incorporated in and giving the cell separator membranes a high but known resistance is localized in the same area in each of the separator membranes to produce a small defined conductive area or known resistance such that when the stack is assembled, the small defined conductive areas are aligned and the total resistance of the plurality of separators can be measured across the entire stack through the aligned localized areas.

3. The apparatus of claim 2 wherein the conductive material is conductive fibers.

4. In an electrochemical cell having a bi-polar layered construction wherein a plurality of commonly connected metal anode layers and a plurality of commonly connected cathode layers are alternately arranged in closely packed, sandwich fashion, each anode and cathode layer being separated by one of a plurality of thin insulating separator membranes to produce a cell stack, the improvement comprising incorporating conductive material in each of the cell separator membranes which gives each cell separator membrane a high but known resistance value such that the total resistance of the plurality of separators can be measured across the entire stack when the stack is assembled without the presence of an electrolyte thereby enabling the total cell resistance to be readily tested to verify the integrity of the layers of the stack of the assembled cell and wherein the conductive material incorporated is conductive fibers.

5. In an electrochemical cell having a bi-polar layered construction wherein a plurality of commonly connected metal anode layers and a plurality of commonly connected cathode layers are alternately arranged in closely packed, sandwich fashion, each anode and cathode layer being separated by one of a plurality of thin insulating separator membranes to produce a cell stack, the improvement comprising incorporating conductive material in each of the cell separator membranes which gives each cell separator membrane a high but known resistance value such that the total resistance of the plurality of separators can be measured across the entire stack when the stack is assembled without the presence of an electrolyte thereby enabling the total cell resistance to be readily tested to verify the integrity of the layers of the stack of the assembled cell and wherein the conductive material incorporated is carbon fibers.

* * * * *

UNITED STATES PATENT AND TRADEMARK OFFICE
CERTIFICATE OF CORRECTION

PATENT NO. : 5 206 099

DATED : April 27, 1993

INVENTOR(S) : Milind V. Kulkarni et al

It is certified that error appears in the above-identified patent and that said Letters Patent is hereby corrected as shown below:

In column 4, line 7, delete "or" and insert -- of -- .

Signed and Sealed this

Twenty-eighth Day of December, 1993

Attest:

BRUCE LEHMAN

Attesting Officer

Commissioner of Patents and Trademarks